US008738700B2

(12) United States Patent
Shafran et al.

(10) Patent No.: US 8,738,700 B2
(45) Date of Patent: May 27, 2014

(54) METHOD AND SYSTEM FOR PROVIDING NETWORK SERVICES

(75) Inventors: Gil Shafran, Kfar Saba (IL); Lenny Ridel, Hod Ha'Sharon (IL)

(73) Assignee: F5 Networks, Inc., Seattle, WA (US)

( * ) Notice: Subject to any disclaimer, the term of this patent is extended or adjusted under 35 U.S.C. 154(b) by 51 days.

(21) Appl. No.: 13/252,481

(22) Filed: Oct. 4, 2011

(65) Prior Publication Data

US 2012/0089677 A1    Apr. 12, 2012

(30) Foreign Application Priority Data

Oct. 8, 2010  (CA) ..................................... 2716544

(51) Int. Cl.
*G06F 15/16*    (2006.01)
(52) U.S. Cl.
USPC .......... 709/204; 709/217; 709/26.1; 370/352; 705/1.1; 705/14.39; 705/7.11
(58) Field of Classification Search
USPC ......... 709/204, 217, 26.1; 370/352; 705/7.12, 705/7.11, 14.39, 1.1
See application file for complete search history.

(56) References Cited

U.S. PATENT DOCUMENTS

| | | | | |
|---|---|---|---|---|
| 6,606,744 | B1 * | 8/2003 | Mikurak | 717/174 |
| 6,671,818 | B1 * | 12/2003 | Mikurak | 714/4.21 |
| 7,716,077 | B1 * | 5/2010 | Mikurak | 705/7.12 |
| 7,957,991 | B2 * | 6/2011 | Mikurak | 705/7.11 |
| 8,032,409 | B1 * | 10/2011 | Mikurak | 705/14.39 |
| 2006/0031384 | A1 | 2/2006 | Manders et al. | |
| 2006/0168154 | A1 | 7/2006 | Zhang et al. | |
| 2007/0110043 | A1 * | 5/2007 | Girard | 370/352 |
| 2008/0192770 | A1 | 8/2008 | Burrows et al. | |
| 2012/0089410 | A1 * | 4/2012 | Mikurak | 705/1.1 |
| 2012/0089677 | A1 * | 4/2012 | Shafran et al. | 709/204 |
| 2012/0166582 | A1 * | 6/2012 | Binder | 709/217 |
| 2012/0259722 | A1 * | 10/2012 | Mikurak | 705/26.1 |

FOREIGN PATENT DOCUMENTS

| | | | |
|---|---|---|---|
| EP | 0817040 A2 | 1/1998 | |
| WO | 2011002777 A2 | 1/2011 | |

\* cited by examiner

*Primary Examiner* — Tammy Nguyen
(74) *Attorney, Agent, or Firm* — LeClairRyan, a Professional Corporation

(57) ABSTRACT

The present invention provides a system for intermediating between client nodes and pools of server nodes in an NGN network where the server nodes provide network services to client nodes, wherein the client nodes use various communication protocols and at least part of said communication protocols are different from the communication protocol used by the server nodes. The system comprising: a cluster of associated gateway nodes providing an integrated service for the clients nodes, where each gateway provides services of at least one of: translations of request and answers between the client node and a provider server node, load balancing and managing scenario rules. Each gateway comprise: a database of scripts including, scenario rules, routing scripts and associated transformation scripts, an execution processing module for handling events of at least client requests and server answers according to scenario rules.

20 Claims, 4 Drawing Sheets

METHOD AND SYSTEM FOR PROVIDING NETWORK SERVICES

BACKGROUND

1. Technical Field

The present invention relates to the field of data communications services, and more particularly, to NGN network services.

2. Discussion of Related Art

The known gateway servers which support communication between client nodes and provider server require customization for configuring the gateway for adapting between the different protocols of the client nodes and provider's server.

BRIEF SUMMARY

The present invention provides a system for intermediating between client nodes and pools of server nodes in an NGN network where the server nodes provide network services to client nodes, wherein the client nodes use various communication protocols and at least part of said communication protocols are different from the communication protocol used by the server nodes.

The system comprise a cluster of associated gateway nodes providing an integrated service for the clients nodes, where each gateway provides services of at least one of: translations of request and answers between the client node and a provider server node, load balancing and managing scenario rules. Each gateway comprise: a database of scripts including, scenario rules, routing scripts and associated transformation scripts, an execution processing module for handling events of at least client requests and server answers according to scenario rules. The module including: a routing manager for selecting the appropriate routing script for the incoming messages or answers from the servers by selecting at least routing script according to the request properties, client profile and session history, where the selected routing script determines the destination server or pools of servers, a transformation manager for selecting the appropriate transformation script for the incoming messages or answers according to the selected routing script, the request properties, client profile and information of session history, and a scenario manager for applying scenario rules on incoming requests and the received answers for generating new subsequence requests derived from clients original requests and received answers.

The handling of the clients requests and generated subsequence request includes activating rules of the selected scripts for transforming sequence of incoming user requests into sequence of transformed requests adapted to destination server communication protocols and transforming sequence of answers coming from the server into sequence of transformed answers adapted to clients nodes communication protocols, where the sequence of incoming user requests or answers includes consecutive client requests or answers having a correlated context.

According to some embodiments of the present invention the scenario rules may define analyzing the requests content and properties for deriving new subsequence requests or answers which perform actions for completing the execution of the original client request.

According to some embodiments of the present invention The scenario rules define analyzing the requests or answers content and properties for deriving new subsequence equivalent requests which are transmitted in parallel to different servers.

According to some embodiments of the present invention the gateway nodes can be interconnected through peer to peer connections.

According to some embodiments of the present invention The sequence of requests can be correlated context is a single session flow.

According to some embodiments of the present invention the selection of the routing scripts and the transformation scripts is preformed by checking at least part of the transformation scripts and checking at least part of the routing scripts.

According to some embodiments of the present invention the execution processing module further handles timeout events, error events, and maintenance events.

According to some embodiments of the present invention the database structure is hierarchical and each routing script is related to a plurality of transformation scripts and each scenario rule is related to plurality of routing scripts.

The present invention provides a method for intermediating between client node and pools of server nodes in an NGN network where the server nodes provide network services to client nodes, wherein the client nodes use various communication protocols, wherein at least part of said communication protocols are different from the communication protocol used by the server nodes. The method comprise the following steps; receiving incoming requests from client nodes, temporarily recording sequence of incoming requests having correlated context, generating subsequent derived requests by analyzing the received incoming request from the client according to scenario rules, selecting the appropriate routing script for each message according to request properties, client profile and session history, determining the destination pool of servers of at least one server according to selected routing script, selecting the appropriate transformation script for each message according to the selected routing script, the request properties, client profile and session history, identifying end of client request sequence according context of requests; activating rules of the selected scripts for transforming sequence of incoming user requests into sequence of transformed requests adapted to destination servers communication protocols, where the sequence of incoming user requests are consecutive client requests having a correlated context, sending transformed requests to destination servers; receiving answers from servers, temporarily recording sequence of received answers related to a correlated context, applying selected transformation script to adapt recorded sequence answers related to a correlated context, to the client node protocol and analyzing answers according to scenarios rules, for generating new subsequent request or activating originating request utilizing the received answers, sending transformed answers to client nodes, According to some embodiments of the present invention selection of the routing scripts and the transformation scripts is preformed by checking at least part of the transformation scripts and checking at least part of the routing scripts.

According to some embodiments of the present invention the sequence of requests or answers are related to a single session flow.

According to some embodiments of the present invention the scenario rules define analyzing the requests content and properties for deriving new serial subsequence requests which perform actions for completing the execution of the original client request.

According to some embodiments of the present invention the scenario rules define analyzing the requests content and properties for deriving parallel new subsequence equivalent requests which are transmitted in parallel to different destination servers.

According to some embodiments of the present invention, at least part of the scenario rules define deriving new serial subsequence equivalent requests which are transmitted in parallel to different destination servers.

According to some embodiments of the present invention the scenario rules enable deriving parallel new subsequence equivalent requests originated from serial subsequence request, said parallel requests are transmitted simultaneously to different destination servers.

According to some embodiments of the present invention at least some of the requests are originated from the server.

BRIEF DESCRIPTION OF THE DRAWINGS

The present invention will be more readily understood from the detailed description of embodiments thereof made in conjunction with the accompanying drawings of which.

DETAILED DESCRIPTION

Figure 1:
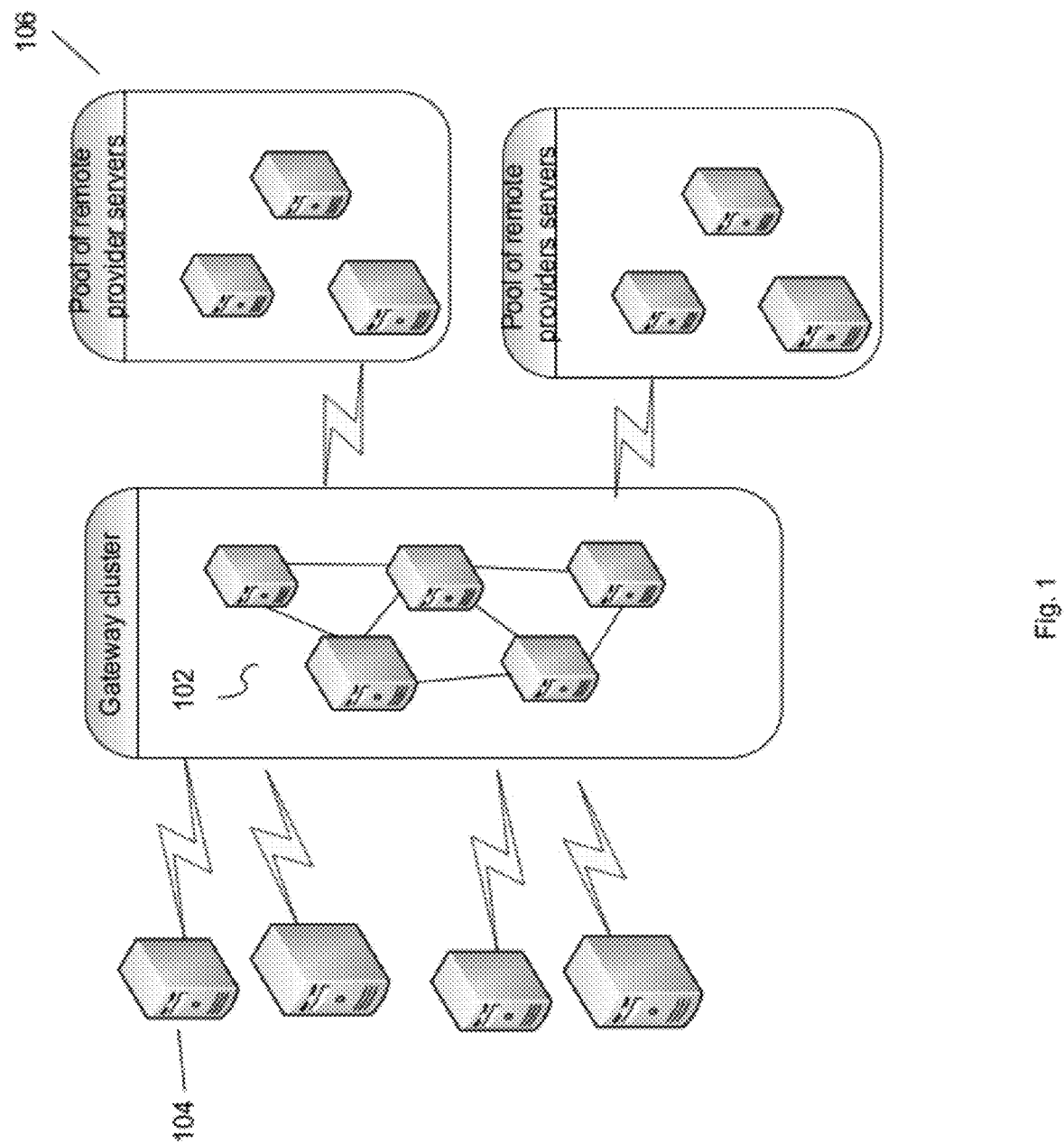
FIG. 1 is a in a overview of environment in which the present invention is practiced according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The present invention discloses a method and system for handling events of an NGN network including requests and answers of client nodes and provider's servers using gateway servers.

FIG. 1 illustrates the environment in which the gateway servers 102 are practiced according to the present invention. The system according to the present invention includes cluster of gateway servers 102 linking between client nodes 104 and a pool of servers 106. In general, the gateway server 102 handles received client requests, processes the requests to be adapted to a protocol of the destination servers 106 and transmits processed requests to the destination server 106. Answers received from the provider servers 106 are processed to be adapted to a protocol of the client 104 and the processed answers are transferred back to the client 104. The gateway server 102 further provides load balancing functionality and analysis of events according to defined scenario rules. The defined scenario rules represent implementation of business rules or policies defined by the system operator. According to some embodiments of the present invention the gateway servers 102 with the cluster are interconnected creating peer to peer network configuration. The gateway servers 102 may function as a single entity distributing the handling and processing of requests between the cluster gateway servers. Each gateway server 102 supports multiple protocols. The pool of servers 106 represents a group of provider servers 106 which share the same network protocol. The gateway server 102 maintains data dictionaries which correspond with the different protocols of clients' nodes and providers' servers.

Figure 2:
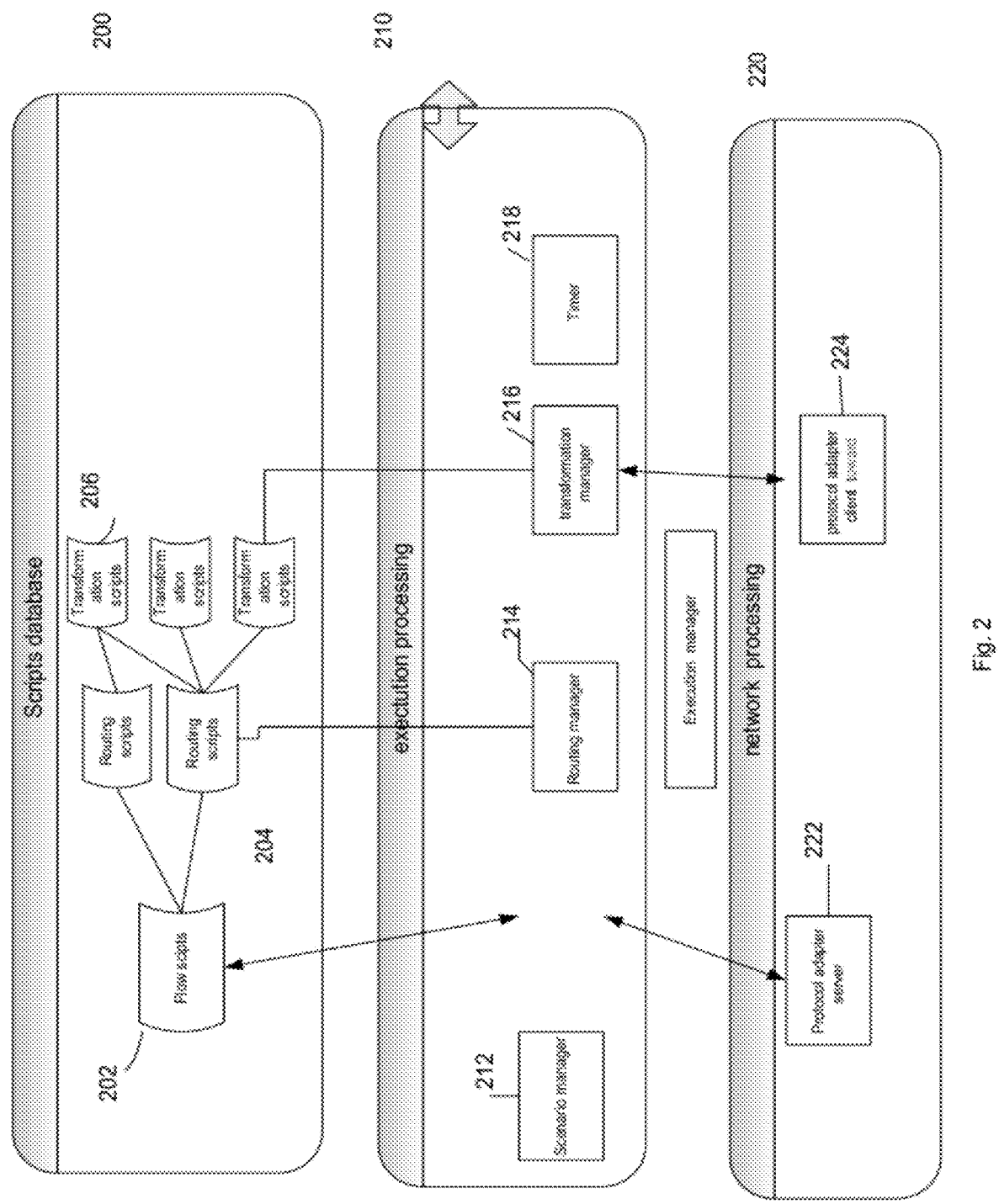
FIG. 2 is a block diagram of gateway components according to some embodiments of the invention.

FIG. 2 illustrates the different components and modules of the gateway server 102 according to some embodiments of the present invention. Each gateway server 102 comprises the following components: a script database 200, execution processing application 210 and network processing module 220. The script database 200 includes scenario rules 202 (referred to in FIG. 2 as flow scripts) defining processing rules for processing the requests and answers, each scenario rule may be configured to correspond with a specific network protocol, one or more routing scripts 204 for determining the destination of requests, and/or one or more transformation scripts 206 for translating between client nodes and server node protocols. According to some embodiments of the present invention the script database 200 structure is hierarchal, where each routing script 204 is associated with a plurality of transformation scripts 206. The execution processing application 210 comprises scenario manager 212 for analyzing incoming requests and answers and determining the rules and flows of actions for handling each event, routing manager 214 for selecting and defining the appropriate routing script 204 and transformation module 216 for selecting the appropriate transformation script 206 for adapting the incoming messages or answers to the destination or server node protocol. The execution processing component 210 further handles timeout events, error events, and maintenance events. Network processing module 220 comprises protocol adapter server module 222 for transforming the incoming client requests to the destination server protocol according to a determined transformation script 206, and client protocol adapter module 224 for transforming the incoming answers to the requesting client protocol according to the determined transformation script 206.

Figure 3:
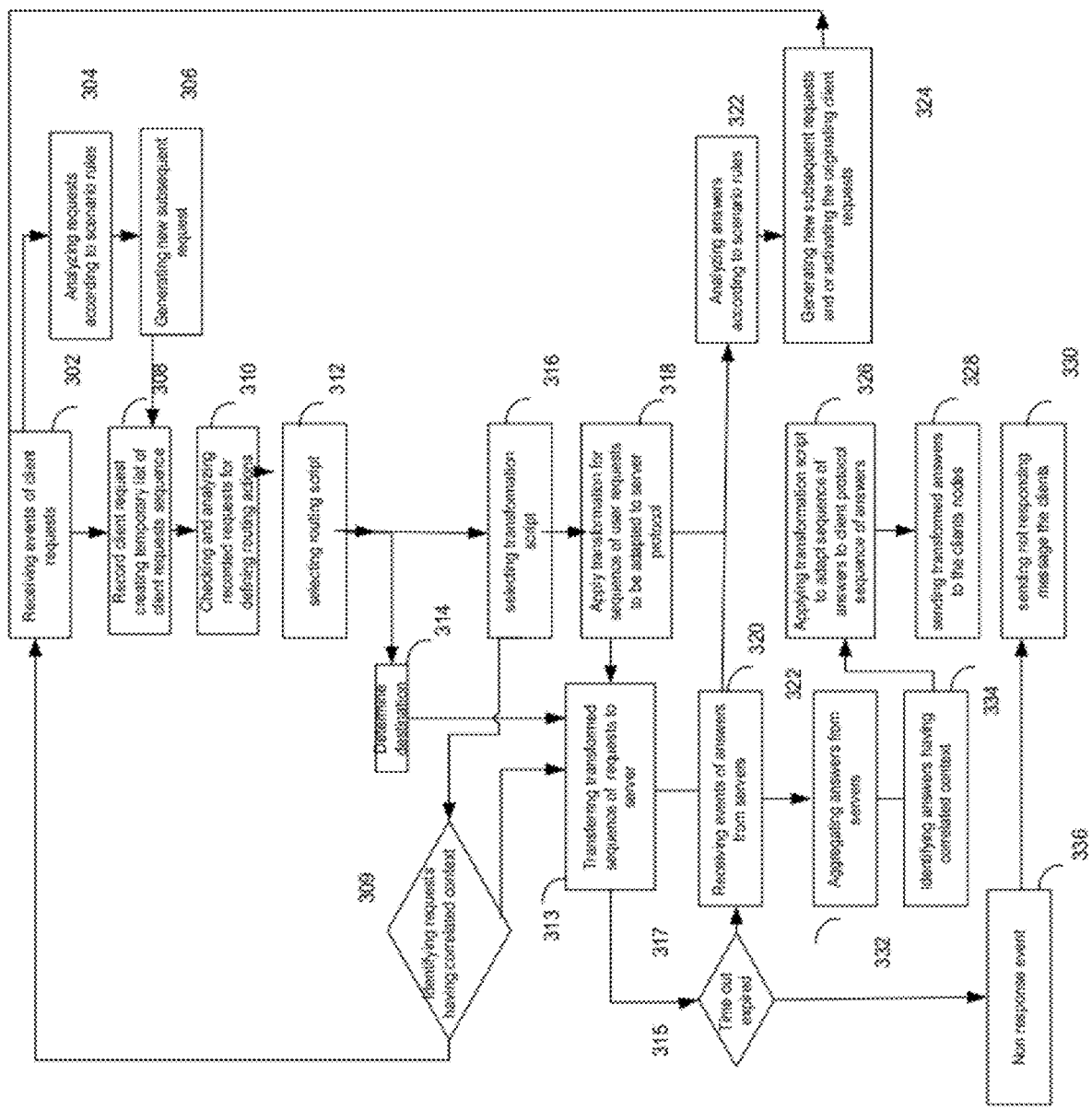
FIG. 3 is a flow chart illustrating the method of handling network events according to some embodiments of the invention.

FIG. 3 illustrates the flowchart of handling events according to some embodiments of the present invention. The events received at the gateway server 102 mainly include client requests received in step 302 and answers received from the provider servers 106 in step 320. The received requests are analyzed in step 304 according to one or more of the predefined scenario rules 202, which can be defined to generate one or more new subsequent requests in step 306 (as further described in FIG. 4) and define the flow of actions for handling the client requests. All the request including original client requests and subsequent requests are recorded in step 308 in a temporary cache list including sequence of the requests. The recorded requests are analyzed for selection of at least one routing script 204 in step 310, determining the routing destination in step 314, and selecting the transformation script in step 316. The temporary list of requests sequence is maintained as long as the requests have a correlated context, for example all requests are within the same communication session of a client 104. Once the system indentified in step 309 that the group of correlated requests has ended, e.g., end of session, the sequence of requests are transformed into a sequence of requests adapted to the protocol of the determined destination server 106 or pool of servers 106 in step 313. Once the transformed requests are prepared, they are transferred to the destination servers 106 in step 313. At this stage the gateway server 102 awaits the provider servers' answers, in case a predefined time has lapsed the (time out expired) as determined in step 315, a non response event is generated in step 336 by the gateway server 102 and transferred to the client 104 in step 330. The gateway server 102 receives events of answers from the provider servers 106 in step 320 and aggregates the answers into a temporary list of answers in step 322. Once the getaway server 102 identifies the end of correlated answers in step 334, the getaway server 102 applies the selected transformation script 206 to adapt the sequence of answers to the protocol associated with the client 104. The received answers are further analyzed according to one or more scenario rules 202 in step 322, the scenario rules 202 may determine new subsequent requests are to be generated or the original request of the client 104 is to be activated in step 324. For example if the answers from the server 106 require additional information to be supplied, such as location information, a new subsequent request is generated for receiving the required information. The new subsequent requests are processed in the same manner as original client's requests are processed.

The transformed answers are transmitted to the client 330.

Figure 4:
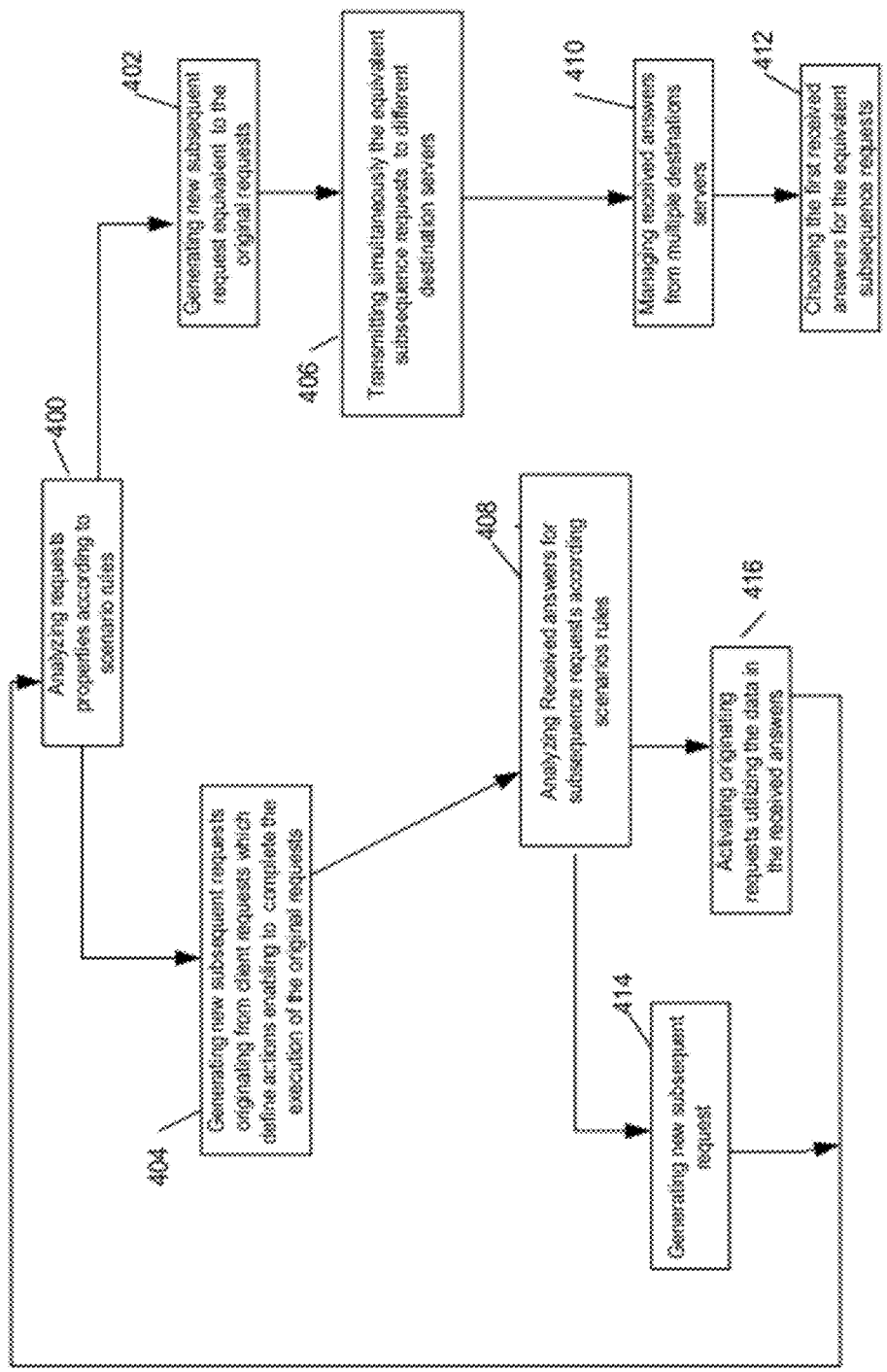
FIG. 4 is a flow chart analyzing and handling networks events according to some embodiments of the invention.

FIG. 4 illustrates the process of analyzing the client requests and answers according to one or more scenario rules 202. The client's requests are analyzed according to the scenario rules in step 400 for enhancing the process of handling the requests. One type of such analysis enables parallel subsequent requests to be generated which are equivalent to the original client's request in step 402, the multiple subsequent requests are transmitted to several servers 106 simultaneously in step 406. The gateway server 102 handles the receiving of the multiple answers from the servers in step 410, and selects the answers from the server 106 which replied in minimum time in step 412. Such method can improve the timing of responding to user requests by the gateway server 102 to the client 104.

Another analysis type of the requests of the scenario rules 202 may identify the need to generate new subsequent requests for performing actions which are required for completing the original client requests. For example the scenario rule 202 may identify that for completing the client request, the user account must be checked before authorizing the request. In such case a new subsequent request for retrieving user account status is generated. The new subsequent request is transmitted to the respective server 106, the received responses are analyzed by the gateway server 102 in step 408. Following our example of checking user account, the received response of the server 106 of user account status is analyzed. In case of positive results, the original request of the user is reactivated and transmitted to the selected destination server 106. Other types of businesses rule analysis may generate one or more new subsequent requests required to complete received answers from the server 106 in step 414, for example location based client requests require one or more subsequent to be generated in order to retrieve location information for completing the server answer.

The two types of business rules analysis may be combined, generating parallel requests of new generated subsequence requests or generating new subsequent requests for new parallel requests.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

What is claimed is:

1. A method for facilitating communications in a telecommunications network, comprising:
   generating, with a gateway server, one or more subsequent requests based on an application of one or more of a plurality of scenario rules to one or more of a plurality of requests received from a client, wherein the plurality of received requests have a same associated context and conform to a first communication protocol associated with the client;
   identifying, with the gateway server, one or more servers in a pool of servers based on an application of one or more of a plurality of routing scripts to one or more of the plurality of received requests;
   applying, with the gateway server, one or more of a plurality of transformation scripts to transform the plurality of received requests and the one or more subsequent requests to conform with a second communication protocol associated with the identified one or more servers and different than the first communication protocol; and
   sending, with the gateway server, the transformed plurality of received requests and one or more subsequent requests to the identified one or more servers.

2. The method of claim 1, further comprising:
   receiving, with the gateway server, a plurality of answers to the one or more transformed plurality of received requests and one or more subsequent requests from the one or more servers;
   transforming, with the gateway server, one or more of the plurality of answers based on an application of the one or more of the plurality of transformation scripts to conform with the first communication protocol; and
   sending, with the gateway server, the transformed one or more of the plurality of answers to the client.

3. The method of claim 2, wherein:
   the one or more subsequent requests comprise a plurality of subsequent requests that are equivalent to the one or more of a plurality of requests received from the client;
   the sending further comprising sending each of the plurality of subsequent requests to a different one of the servers in the pool of servers substantially in parallel; and
   the transformed one or more of the plurality of answers comprises a first received one of the plurality of answers.

4. The method of claim 2, further comprising:
   suspending, with the gateway server, the transforming and sending of the plurality of received requests;
   determining, with the gateway server, whether the plurality of answers to the transformed one or more subsequent requests has been received; and
   activating, with the gateway server, the suspended plurality of received requests using data included in the plurality of answers to the transformed one or more subsequent requests.

5. The method of claim 4, wherein the one or more subsequent requests are configured to retrieve the data from the one or more of the servers and the data is required for completing the plurality of received requests.

6. The method of claim 1, wherein the plurality of scenario rules, the plurality of routing scripts, and the plurality of transformation scripts are stored in a scripts database having a hierarchical structure such that each of the plurality of scenario rules is related to one or more of the plurality of routing scripts and each of the plurality of routing scripts is related to one or more of the plurality of transformation scripts.

7. The method of claim 1, wherein the same associated context comprises a same communication session.

8. The method of claim 1, further comprising selecting, with the gateway server, the one or more scenario rules, the one or more routing scripts, or the one or more transformation scripts from a scripts database based on one or more properties of the one or more of the plurality of received requests, a profile associated with the client, or a session history.

9. The method of claim 1, further comprising load balancing, with the gateway server, the plurality of requests to a plurality of the severs in the server pool according to the one or more of the routing scripts.

10. The method of claim 1, further comprising:
    recording, with the gateway server, a sequence of the plurality of received requests having the same associated context in a cache list;
    determining, with the gateway sever, when the associated context has ended; and
    performing, with the gateway sever, the generating, identifying, applying, and sending steps based on the cache list when the associated context is determined to have ended.

11. A gateway server apparatus, comprising:
    a memory coupled to the a processor which is configured to execute programmed instructions stored in the memory comprising:
       generating one or more subsequent requests based on an application of one or more of a plurality of scenario rules to one or more of a plurality of requests received from a client, wherein the plurality of received requests have a same associated context and conform to a first communication protocol associated with the client;
       identifying one or more servers in a pool of servers based on an application of one or more of a plurality of routing scripts to one or more of the plurality of received requests;
       applying one or more of a plurality of transformation scripts to transform the plurality of received requests and the one or more subsequent requests to conform with a second communication protocol associated with the identified one or more servers and different than the first communication protocol; and
       sending the transformed plurality of received requests and one or more subsequent requests to the identified one or more servers.

12. The apparatus of claim 11 wherein the processor is further configured to execute programmed instructions stored in the memory further comprising:
    receiving a plurality of answers to the one or more transformed plurality of received requests and one or more subsequent requests from the one or more servers;
    transforming, one or more of the plurality of answers based on an application of the one or more of the plurality of transformation scripts to conform with the first communication protocol; and
    sending the transformed one or more of the plurality of answers to the client.

13. The apparatus of claim 11, wherein:
    the one or more subsequent requests comprise a plurality of subsequent requests that are equivalent to the one or more of a plurality of requests received from the client;
    the sending further comprising sending each of the plurality of subsequent requests to a different one of the servers in the pool of servers substantially in parallel; and
    the transformed one or more of the plurality of answers comprises a first received one of the plurality of answers.

14. The apparatus of claim 11, wherein the processor is further configured to execute programmed instructions stored in the memory further comprising:
- suspending the transforming and sending of the plurality of received requests;
- determining whether the plurality of answers to the transformed one or more subsequent requests has been received; and
- activating the suspended plurality of received requests using data included in the plurality of answers to the transformed one or more subsequent requests.

15. The apparatus of claim 11, wherein the one or more subsequent requests are configured to retrieve the data from the one or more of the servers and the data is required for completing the plurality of received requests.

16. The apparatus of claim 11, wherein the plurality of scenario rules, the plurality of routing scripts, and the plurality of transformation scripts are stored in a scripts database having a hierarchical structure such that each of the plurality of scenario rules is related to one or more of the plurality of routing scripts and each of the plurality of routing scripts is related to one or more of the plurality of transformation scripts.

17. The apparatus of claim 11, wherein the same associated context comprises a same communication session.

18. The apparatus of claim 11, wherein the processor is further configured to execute programmed instructions stored in the memory further comprising selecting the one or more scenario rules, the one or more routing scripts, or the one or more transformation scripts from a scripts database based on one or more properties of the one or more of the plurality of received requests, a profile associated with the client, or a session history.

19. The apparatus of claim 11, wherein the processor is further configured to execute programmed instructions stored in the memory further comprising load balancing the plurality of requests to a plurality of the severs in the server pool according to the one or more of the routing scripts.

20. The apparatus of claim 11, wherein the processor is further configured to execute programmed instructions stored in the memory further comprising:
- recording a sequence of the plurality of received requests having the same associated context in a cache list;
- determining when the associated context has ended; and
- performing the generating, identifying, applying, and sending steps based on the cache list when the associated context is determined to have ended.

* * * * *

UNITED STATES PATENT AND TRADEMARK OFFICE
CERTIFICATE OF CORRECTION

PATENT NO. : 8,738,700 B2
APPLICATION NO. : 13/252481
DATED : May 27, 2014
INVENTOR(S) : Leonid Ridel and Gil Shafran It is certified that error appears in the above-identified patent and that said Letters Patent is hereby corrected as shown below:

In the Claims:

In claim 11, at col. 8, line 23, delete "the" immediately prior to "a processor".

Signed and Sealed this
Twenty-sixth Day of August, 2014

Michelle K. Lee
*Deputy Director of the United States Patent and Trademark Office*